Jan. 18, 1955    R. GRUNWALD ET AL    2,699,676
TESTING DEVICE FOR FILM
Filed June 14, 1952    3 Sheets-Sheet 1
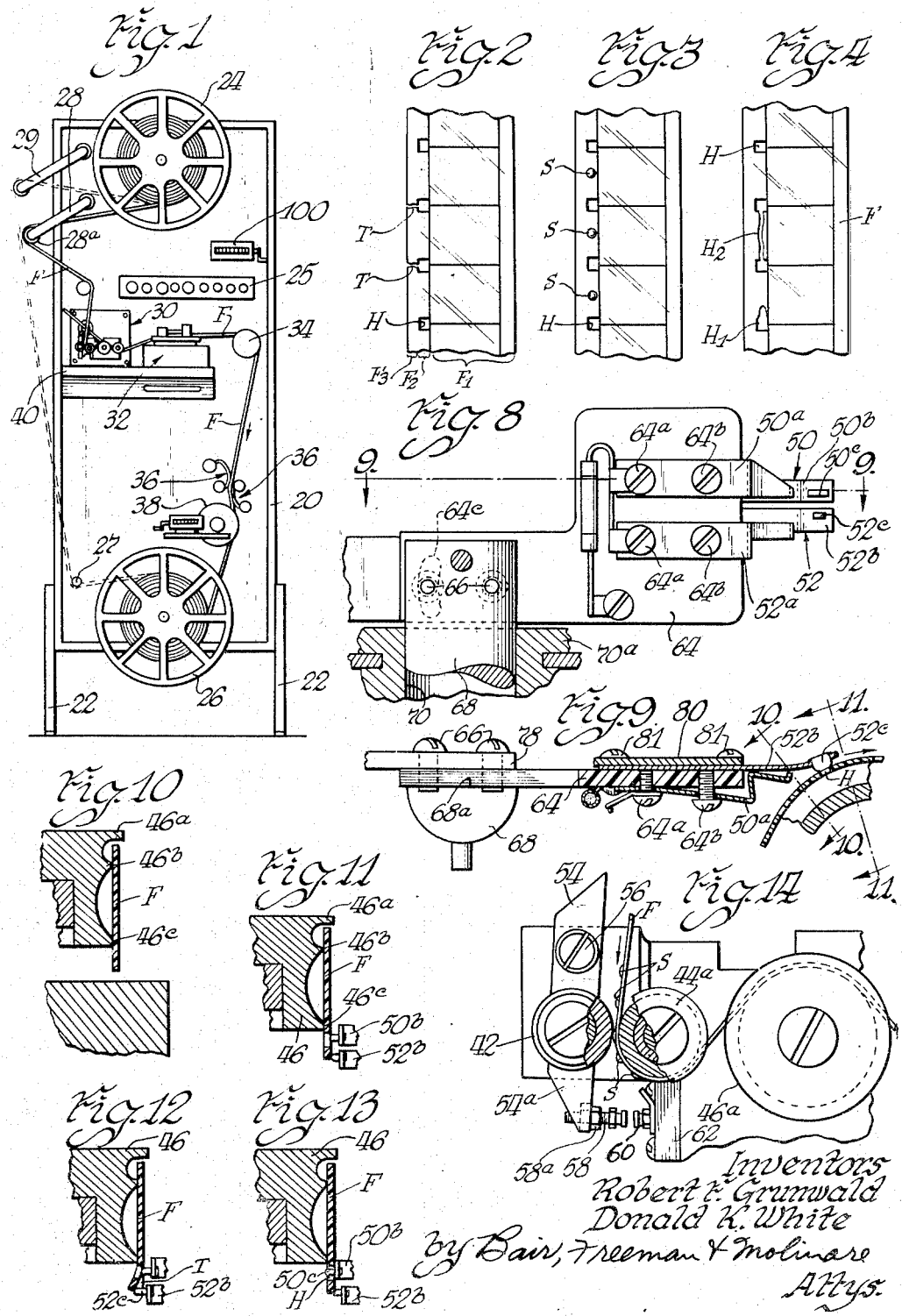
Inventors
Robert F. Grunwald
Donald K. White
by Bair, Freeman & Molinare
Attys.

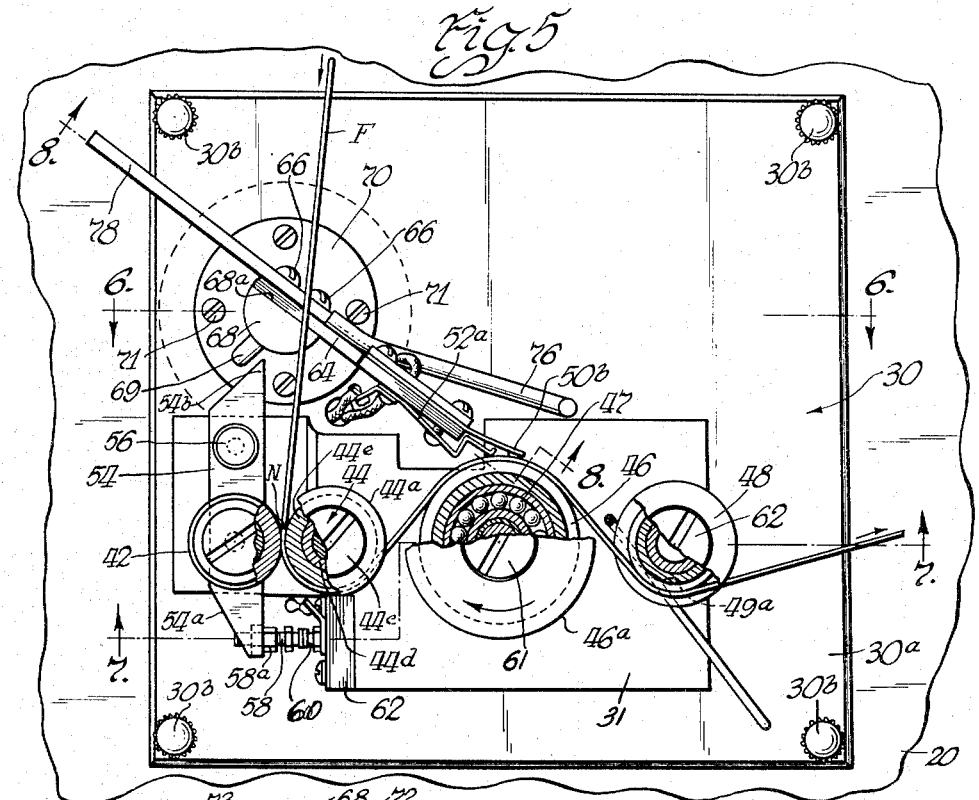

United States Patent Office 2,699,676
Patented Jan. 18, 1955

2,699,676

TESTING DEVICE FOR FILM

Robert Grunwald, Chicago, and Donald K. White, Evanston, Ill.

Application June 14, 1952, Serial No. 293,699

10 Claims. (Cl. 73—157)

Our invention relates to an improved device automatically operative to inspect motion picture film for splices, sprocket run-off or punch, broken sprocket holes, sprocket tear and other defects.

Motion picture film usually consists of an elongated strip of transparent material having a picture track extending over the greater portion of its width. The picture track has a series of successive pictures, or frames, which are projected in rapid order to produce the illusion of motion. The film has sprocket tracks adjacent the picture track where it is punched in a series of equally spaced holes to receive the sprocket wheels of the projector to index the successive pictures shown on the screen. Outboard of the sprocket holes, the film has a continuous web or track which defines a continuous edge of the film.

After a film has been projected, especially after many projections or after use on a faulty projector, it tends to acquire defects which will impair future projections. Among these defects are: elongated sprocket holes; sprocket run-off or punch, where the projector sprocket has run out of registry with the sprocket holes and indented or embossed the film; sprocket holes torn laterally, out to the edge of the film; loose or poorly made splices; splices made with adhesive or cellophane tape; splices made with pins, paper clips or staples; and breaks in the film. Depending upon the type of projection equipment used in subsequent showings, these defects may cause loss of registration during projection; loss of synchronization between sound and picture; further tearing or damage to the film; or interruption in the showing.

In order to find and repair these defects, and to establish any liability of the preceding film user for damage to the film, it is the custom in the film industry to inspect each film after its use by one exhibitor, before it is sent to the next exhibitor. Heretofore, this inspection has been done by hand or semi-automatic methods whereby the film is passed between the fingers of the operator and the presence of defects is detected by the sense of touch. This method is inherently inaccurate and incapable of detecting many defects of great importance to projection. Moreover, it is limited as to speed and reliability.

In accordance with the present invention, an improved automatic device is provided to detect defects in films. This device is very fast in operation and can detect and identify the principal film defects. It can be run very rapidly and automatically stops or indicates, as desired, when defects are encountered. A single operator can run a number of the devices and inspect many more films, and do so more accurately, than would otherwise be possible.

It is, therefore, a general object of the present invention to provide an improved automatic film inspecting device.

Another object of the present invention is to provide an improved device capable of detecting and counting film splices and responding to their length and position.

Still another object of the present invention is to provide an improved device capable of detecting damaged sprocket holes in film.

Further, it is an object of the present invention to provide an improved device capable of detecting sprocket punch or run-off in motion picture film.

Another object of the present invention is to provide an improved device capable of detecting sprocket tear in motion picture film.

It is an additional object of the present invention to provide an improved motion picture film inspecting device which is fully automatic in operation, rapid, reliable, easily tested, simple in construction, and inexpensive to the end that a highly useful commercial device is provided.

The novel features which we believe to be characteristic of our invention are set forth with particularity in the appended claims. Our invention itself, however, both as to its organization and method of operation, together with further objects and advantages thereof, will best be understood by reference to the following description taken in connection with the accompanying drawings in which:

Figure 1 is a front elevational view of a film inspecting device constructed in accordance with the present invention;

Figures 2, 3 and 4 are fragmentary plan views of motion picture film showing the principal defects detected by the apparatus of the present invention;

Figure 5 is an enlarged front elevational view of the detecting head structure of the device of Figure 1;

Figures 6 and 7 are cross-sectional views through axes 6—6 and 7—7, Figure 5, respectively.

Figure 15:
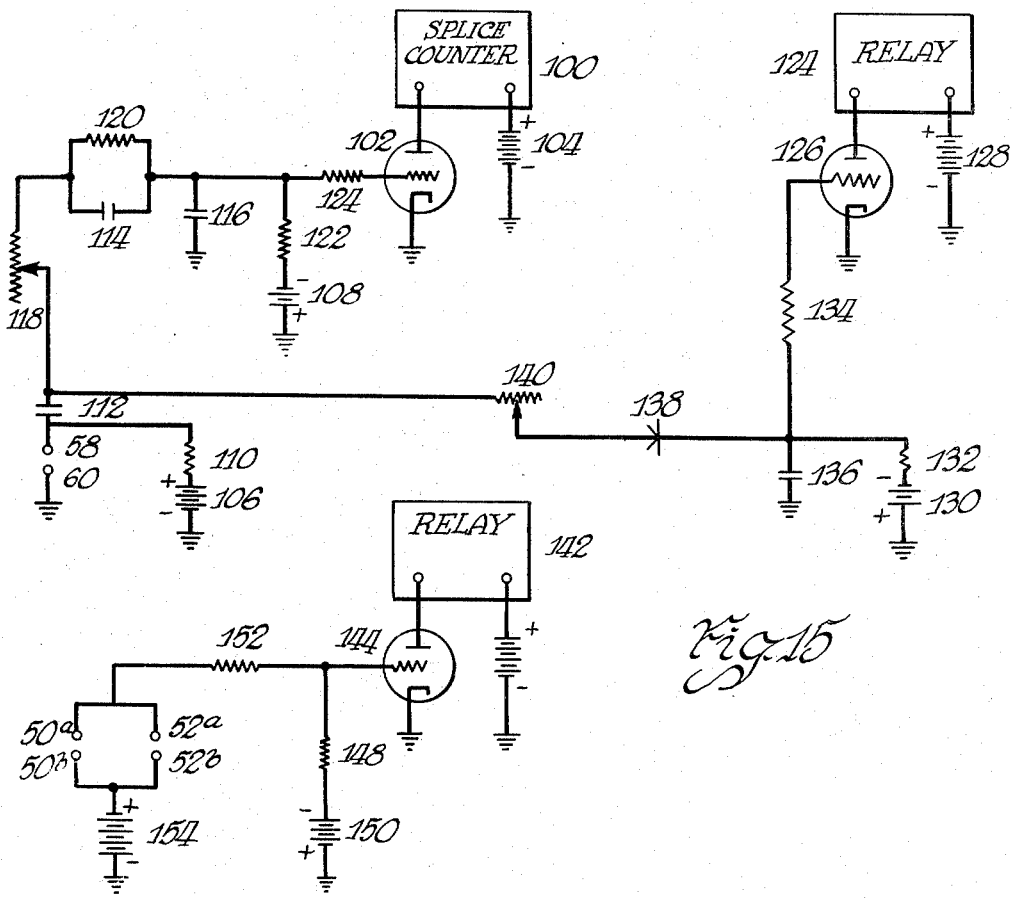
Figure 16:
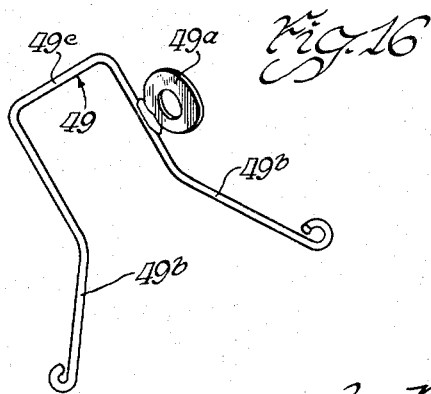

Figure 8 is a fragmentary cross-sectional view through axis 8—8, Figure 5;

Figure 9 is a cross-sectional view through axis 9—9, Figure 8;

Figures 10 and 11 are cross-sectional views through axes 10—10 and 11—11, Figure 9, respectively;

Figures 12 and 13 are views like Figure 11 but showing the apparatus detecting sprocket tear and a broken sprocket hole, respectively;

Figure 14 is a fragmentary portion of the view of Figure 5 showing the film thickness sensing rollers as actuated by one of a series of sprocket punches;

Figure 15 is the circuit diagram of the indicating mechanism of the apparatus of Figure 1; and Figure 16 is a view in perspective of one of the film guides of the apparatus of the present invention.

The complete film inspecting device shown in Figure 1 consists of a vertical panel 20 supported at adjustable height by the legs 22. The film to be inspected is wound on a play-out reel 24 rotatably supported on the upper part of the panel 20 and extends in a web F to the take-up reel 26. Suitable motor drive means (not shown) is provided to rotate reel 26 and wind the film.

In travelling from the reel 24 to the reel 26, the film F passes over the idler pulley 28a carried by the spring pressed rocker arm 28, which maintains the unwind film tension. The film then traverses the detecting head indicated generally at 30, described in detail hereafter, and the visual inspecting mechanism at 32. Thereafter, the film travels over drive capstan 34, film cleaning units 36, and the idler and length measuring wheel 38 to the take-up reel 26. A forwardly extending table 40 is provided to facilitate visual inspection and splicing of the film as required.

Figures 2, 3 and 4 show motion picture film of the type inspected by the apparatus of the present invention. This film has a picture and sound track $F_1$ containing a series of successive exposures or frames and the accompanying sound track; a sprocket track $F_2$ adjacent the picture track; and a continuous web or track $F_3$ outboard the sprocket track. The film is projected by moving the film past the projecting lens in an intermittent motion, with each successive frame dwelling in front of the lens to produce a momentary stationary picture. The successive frames are indexed in correct position by sprocket wheels on the projector which ride in the holes H of the sprocket track.

The visual inspecting and splicing unit 32 consists of a pane of ground glass over which the film travels (not shown), a light behind the glass to permit observation of the film under transmitted light (not shown), and a magnifying lens overlaying the film and ground glass (not shown) to provide an enlargement of the transmitted light. If desired, an apparently stationary image can be obtained by using a stroboscopic light source of proper frequency. The apparatus 32 also includes a conventional film splicing kit for the convenient splicing of portions of the film that require splicing.

The film defect sensing apparatus consists of the head 30, shown in enlarged view in Figure 5. This apparatus comprises a panel 30a which is secured to the panel 20 by the thumb screws 30b. The panel 30a carries the rollers 42 and 44, which sense the film thickness, the roller 46 which coacts with feelers 50 and 52, Figure 8, to detect sprocket hole and related defects, and the guide roller 48.

The construction and operation of the rollers 42 and 44 are shown in Figures 5, 6, 7 and 14. As shown, these rollers have a right cylindrical surface of sufficient width to receive the entire lateral extent of the film F, including the sprocket hole track and the outboard continuous web portion. The roller 44 has an outboard flange portion 44a and an inboard flange portion 44b which overlay other edges of the roller 42 to retain the film in centered or registered position. The roller 44 is carried on a fixed axis by the screw 44c which is threadedly received in the panel 31. A bearing sleeve 44d is interposed between the fixed screw 44c and the outer face portion 44e of the roller.

The roller 42 is mounted on the arm 54 which is rockably supported from the panel 31 by the headed pin 56 which is threadedly received by the panel 31. The pin 56 extends through the panels 30a and 31, as shown in Figure 7, and on the back side thereof receives the collar 57. This collar in turn has a radially projecting stub 57a which receives the spring 59 which at its opposite end is anchored to the panel 30a by the bracket 59a welded to the panel. The spring 59 coacts with stub 57a to urge the arm 54 in direction to close roller 42 against the roller 44, thus defining a nip N between the rollers and through which the film passes.

The arm 54 extends outboard of the roller 42 at portion 54a. This portion of the arm receives a contact screw 58 which carries a jam nut 58a to anchor it in adjusted position. The contact screw 58 coacts with a fixed contact 60 which is carried by the insulating support member 62.

The contact screw 58 is adjusted to permit the film F to pass between the rollers 42 and 44 without interrupting contact between screw 58 and contact 60. It is adjusted to open the contacts when a splice passes between the rollers. In a device for inspecting 16 mm. film, for example, the contact screw 58 is preferably adjusted to clear about 0.007 inch, which is the normal film thickness of 0.006 inch with some additional clearance to avoid accidental operation. The contacts then open on a thickness of 0.007 inch or more, which is the thickness of a splice and the thickness of a significant sprocket punch. Also, a butt-type splice using pressure-sensitive adhesive tape is of sufficient thickness to space the rollers 42 and 44 in an amount to open the contacts.

Figure 14 shows the arm 54 as swung against the bias of spring 59 by one of a series of sprocket punches S. Such punches are shown in plan view in Figure 3.

The construction of the roller 46 is shown in Figures 5, 7 and 10. This roller has an outboard flange 46a against which the film rests, as shown in Figure 10. The surface of the roller 46 is of hour-glass shape to support the film F at spaced points 46b and 46c, as shown in Figure 10. Point 46c is at the edge opposite flange 46a and is located just inboard of the sprocket hole track of the film. This is seen in Figure 11. The roller 46 is mounted on the panel 31 by the screw 61 which is threadedly received by panel 31 as shown in Figure 7. The screw receives the inner race of the ball bearing 47, the outer race of which is tightly received by the roller 46.

As shown in Figures 5 and 7, the guide roller 48 is secured to the panel 31 by the screw 62 which is threadedly received in the panel 31.

The feelers 50 and 52 are mounted on the insulating arm 64. This arm is held by screws 66 to the flat face 68a of the stub shaft 68. This shaft is in turn rotatably supported on the panel 30a by the sleeve 70 which has an outboard flange 70a secured to panel 30a by the screws 71. The stub shaft 68 receives a disk 72 secured thereto by a set screw 73. This disk has an extending pin 72a which engages the fixed protuberance 30c to arrest rotation of the shaft 68, and hence arm 64, at a predetermined position of arm lift. The shaft 68, and hence arm 64, is biased in the opposite direction by the spiral wire spring 74 which is anchored at one end to the disk 72 by the screw 74a and at the other end to the panel 30a by the screw 30d shown in phantom in Figure 6.

Outrigger 76, Figures 5 and 6, is secured by welding to the handle or finger piece 78 which is sandwiched between screws 66 and the insulating arm 64 as shown in Figure 9. The arm 76 is of such shape as to overlay and protect the feelers 50 and 52 from accidental mechanical damage.

As shown in Figure 8, the feelers 50 and 52 consist of fixed contact arms 50a and 52a and corresponding movable contact arms 50b and 52b. The former are secured to the insulating arm 64 by the screws 64a threadedly received by that arm. The latter contact arms are sandwiched between the metal plate 80 and the insulating arm 64 and thus held in position. Plate 80 is secured to the arm 64 by the screws 81 which are threadedly received on arm 64. The movable contact arms 50b and 52b receive sapphire jewels 50c and 52c, respectively, near their outer ends. These jewels ride against the film without significant wear or significant tendency to damage the film.

The fixed contact arms 50a and 52a are adjusted by adjustment of the screws 64b, Figures 8 and 9. These arms are naturally flexed in the downward direction and are drawn upwardly in accord with the adjustment of their anchoring screws 64b. The screws are adjusted to hold the arms 50a and 52a in a non-contacting position when the jewels 50c and 52c ride on a normal section of the film F.

The jewel 50c is of somewhat larger extent in the longitudinal direction of the film than the sprocket holes H, Figures 2 and 9. The width of this jewel is slightly less than the width of the sprocket holes. When the sprocket holes H are of normal size, this jewel rides over them without extending into them, thus holding the contact arm 50b in non-contacting position, as shown in Figures 9 and 11. However, if a sprocket hole is elongated as shown at $H_1$, Figure 4, the jewel 50c is received in the hole and allows arm 50b to flex downwardly as seen in Figure 9 to contact-making position in rotation to arm 50a. This condition is shown in Figure 13. Similar contact-making action occurs when the film is torn between a pair of sprocket holes as at $H_2$, Figure 4.

Either an elongated sprocket hole $H_1$, Figure 4, or a pair of sprocket holes joined by a torn web, as at $H_2$, Figure 4, prevents accurate indexing of the film by the use of that hole. Such sprocket holes are accordingly undesirable. The feeler defined by the jewel 50c and the arms 50a and 50b, Figure 9, establishes contact when these imperfections exist and, as is further described in detail, actuates indicating mechanism to show this fact.

The feeler arm 52b, carrying jewel 52c, rides on the outboard web $F_3$, Figure 2, of the film. This is best shown in the views of Figure 6 and 11 to 13. Since this feeler bears on this outboard web, and the roller 46 does not support the web, the feeler bends the web over as shown in Figure 12 if the web is weak in any respect. Ordinarily, weakness of this kind is caused by cracks or tears in the film, such as shown at T, Figure 2, the tears extending out from the sprocket holes to the margin of the film.

Tears such as T, Figure 2, are undesirable because they lead to further tearing as the film is used and, in addition, they can cause loss of proper sprocket registration, thus causing the picture not to project correctly and frequently produce sprocket punches that further damage the film. If the film tears completely across, the display is completely interrupted.

When the feeler arm 52b flexes in response to the presence of a weak web portion $F_3$ of the film, it establishes electrical contact with the arm 52a. As is described hereafter in further detail, this actuates a suitable indicator.

Limited rotational adjustment of the insulating arm 64 in relation to the axis of the stub shaft is permitted by the elongated arcuate slot 64c, Figure 8. This permits accurate alignment of the feelers 50 and 52 with the tracks $F_2$ and $F_3$ of the film, respectively.

When the film F is threaded through the head 30, the feelers are lifted to spaced position in relation to the roller 46 by depressing the finger piece 78, Figure 5. This rocks the stub shaft 68 and the pin 69 projecting from the forwardly protruding end thereof. As the pin 69 rotates (counterclockwise as seen in Figure 5), it engages the upwardly protruding end 54b of the arm 54.

Further depression of the finger piece 78 also rocks the arm 54 in the clockwise direction, thereby swinging roller 42 to spaced position in relation to the roller 44 and opening the nip therebetween. The film F can then easily be threaded through the unit.

The indicators

The indicator mechanism is shown in schematic form in Figure 15. A splice counter 100, Figures 15 and 1, is connected to the contacts 60 and 58 through the thyratron tube 102 to indicate the number of splices encountered without stopping the machine. The counter unit 100 is a conventional electric counter consisting of a suitable solenoid (not shown) which, when energized, attracts a movable plunger to rotate suitable number dials (not shown) a distance corresponding to one unit. The thyratron 102 may, for example, be a type 2021 with its heater (not shown) energized and its screen (not shown) connected to ground. When suitable positive potential is applied to the control grid of this tube, the cathode-anode space is rendered conducting to cause counter-actuating current flow from the source 104 through the counter 100.

The contacts 60 and 58 are normally closed. This prevents application of positive voltage from the source 106 to the control electrode of tube 102 and permits essentially the full negative voltage of the source 108 to appear at the control electrode. This negative voltage is sufficient to maintain the tube 102 in a non-conducting state.

If, for reason of a splice or a sprocket punch, the contacts 60 and 58 are separated, the voltage of source 106 is impressed through the resistance 110 across these contacts. This applies positive voltage to the control electrode of the tube through the RC network defined by capacitors 112, 114 and 116 and the resistances 118, 120, 122 and 124. The capacitor 112 is very large in relation to the size of the other capacitors so that the effect of this circuit is to apply a larger positive voltage to the control electrode of tube 102 and thereby fire it. The conducting condition thus established actuates splice counter 100.

The splice counter 100 includes auxiliary contacts (not shown) which interrupt the cathode-anode circuit of the tube 102 when the counter is actuated. The mechanical inertia associated with this action is sufficient to hold the circuit open until a normal splice has passed contacts 60 and 58 and the capacitor 112 has discharged through resistances 110, 118, 120, and 122 to a voltage incapable of firing the tube.

The relay 124 has contacts in the circuit of battery 104 to interrupt the conducting condition of tube 102, thus preventing continued counting of splices. A suitable reset switch (not shown) is provided to re-establish current flow in tube 102. A splice of extended length acts to hold the contacts 58—60 for a time longer than that required to charge capacitor 136 through rectifier 138 to the firing voltage of tube 126. This stops the unit.

The contacts 60 and 58 also actuate relay 124. This relay is connected to the cathode-anode spacing path of the tube 126 in series with the voltage source 128. The control electrode of tube 126 is normally biased to hold it at a non-conducting condition by the negative voltage source 130 acting through the resistors 132 and 134.

When the contacts 58 and 60 are opened by reason of sprocket punch or a splice in the film, the positive voltage of source 106 is impressed across capacitor 136 through the capacitor 112, the resistances 110 and 140, and the rectifier 138. The rectifier 138 is poled to permit charging current flow to capacitor 136 from the source 106. Capacitor 136 (i. e.: 0.1 mfd.) is small in comparison with capacitor 112 (i. e.: 2 mfd.) so that most of the voltage associated with this charging action appears across capacitor 136.

The charging circuit from source 106 through the capacitor 136 has a relatively long time constant in relation to the period of opening contacts 60 and 58 associated with any single sprocket punch or splice. In one successful embodiment of the unit this time constant is about one-half second. Since the sprocket punches open the contacts 60 and 58 much more rapidly than the frequency corresponding to this time constant, the capacitor 136 progressively charges as the contacts are repeatedly opened.

The relative values of resistances 132 and 134, the capacity of capacitor 136, and the voltage of source 106 are so chosen that the tube 126 fires when the desired number of sprocket punches are encountered. This number may be adjusted by varying resistance 140 which controls the rate of charging capacitor 136 upon each sprocket punch.

The relay 124 includes elements (not shown) to interrupt operation of the film drive mechanism, thus arresting film motion so that the operator can make such repairs as are necessary. In addition, the relay lights a suitable lamp or indicator panel 25, Figure 1, thus advising the operator the nature of the imperfection.

The capacitor 136 discharges and is charged negatively through resistance 132. The time constant of this circuit is sufficiently short to restore normal negative bias on tube 126 by the time the unit is restarted. A time constant of about 0.5 seconds has proven successful for this purpose.

The relay 124 includes contacts (not shown) which interrupt the circuit to source 128 when the relay is actuated. This extinguishes the tube and prepares it for resumption of normal non-conducting operation.

The feelers 50 and 52 are connected to actuate relay 142. This relay, when actuated, interrupts the drive to reel 26 and energizes a light on panel 25 to indicate the nature of the imperfection encountered. Tube 144 is a thyratron tube like tubes 102 and 126. It is biased to a non-conducting state by the source 150, acting through resistance 148. When the contacts 50a—50b, or the contacts 52a—52b, are closed by reason of an enlarged sprocket hole or a tear in the film, the control electrode of the tube 144 is connected to the positive voltage source 154 through resistance 152. This drives the control electrode of the tube 144 to a value sufficient to fire the tube 144, thereby actuating the relay 142.

The film cleaners 36, Figure 1, consist of arcuate shoes faced with a soft material such as felt. These are supported from panel 20 to engage the opposite faces of the film and thus wipe all dirt therefrom. If desired, the cleaners may utilize lengthy tapes of soft material which are positively driven in countermotion in relation to the film and in response to the film motion to provide continuous presentation of fresh cleaning surfaces to the film.

The apparatus above described can be tested by forming a loop of film and causing it to travel continuously through the head portion 30 of the unit. By providing splices and other defects in the test loop, the ability of the unit to respond to the same can be checked.

When the film is fully wound on the reel 26, it may be rewound on reel 24 by threading it over spring biased arm 29, Figure 1. This threading is over the idler 27, Figure 1, and extends directly to the arm 29. A suitable drive (not shown) for the reel 24 is provided and actuated by depression of the arm 29 under the film tension, thus causing the film, once started, to wind up on the reel 24 until it is fully wound thereon.

The arm 28 is preferably connected to suitable switch elements (not shown) which interrupt the drive to reel 26 when film tension is lost as the end of the film leaves reel 24, or if there is a break in the film.

If desired, the various rollers and pulleys in the machine, or any desired roller or pulley, may be provided with guides to retain the film against sliding off the roller or pulley. One such guide is shown for purposes of illustration at 49, Figures 5, 6 and 7, and in enlarged perspective view in Figure 16. It consists of a pair of outwardly extending wings 49b, Figure 16, and a web 49c defining a throat guiding the film onto the surface of the pulley 48. The guides 49 are secured to suitable washers 49a which are pressed by the screw 62 against the sleeve 48a, to secure them in position as shown in Figures 5 and 7.

It will be noted that rollers 42 and 44 are on opposite sides of the film and bear against each other. They straddle the film. Thus they define a nip through which the film passes. Roller 42 is movably supported to permit this nip to open and close in accord with the effective thickness of the film as it passes between the rollers.

In the appended claims we have used the term "effective film thickness" to refer to the film thickness which separates rollers 42 and 44. This thickness may be due to the actual film thickness, the thickness of the film plus the tape, if any is affixed thereto, or to embossings on the film which separate the rollers as if the film in fact were thicker.

While we have shown and described our invention by reference to a specific apparatus, it will be understood that other embodiments may be made without departing from the true spirit and scope of the invention. We therefore intend by the appended claims to cover all modifications and alternative constructions falling within their true spirit and scope.

What we claim as new and desire to secure by Letters Patent of the United States is:

1. In a motion picture film inspecting device, the improvement comprising; a pair of film-receiving rollers adapted to straddle a film, means retractably supporting one roller in relation to the other to define a film-receiving nip, electrical contact elements operable to establish a predetermined contact relationship in response to retractile movement of one roller in relation to the other due to the effective film thickness, and indicating means responsive to said predetermined contact relationship if maintained longer than a predetermined time.

2. In an inspecting device for motion picture film of the type having a relatively wide picture track, a sprocket-receiving perforated track adjacent the picture track, and a continuous web outboard of the perforated track, the improvement comprising: a film-receiving roller having a marginal flange against which the film abuts and a film-receiving face adjacent the flange and over which the film rides, the film-receiving face being of smaller extent than the picture track of the film; a pair of feelers mounted in juxtaposition with the roller and outboard the film-receiving face to ride on the perforated track and the continuous web, respectively, the feeler riding on the perforated track having a greater extent longitudinally of the film than the longitudinal extent of the perforations; and indicating means responsive to motion of the feelers into the normal plane of the film.

3. In an inspecting device for motion picture film having a relatively wide picture track, a sprocket-receiving perforated track adjacent the picture track, and a continuous web outboard of the perforated track, the improvement comprising: a film-receiving roller having a marginal flange against which the film abuts and a film-receiving face adjacent the flange and over which the film rests, the film-receiving face being of smaller extent than the picture track of the film and supporting the film at spaced points, one point being adjacent the perforated track; a pair of feelers mounted in juxtaposition with the roller and outboard the film-receiving face to ride on the perforated track and the continuous web, respectively, the feeler riding on the perforated track having a greater extent longitudinally of the film than the longitudinal extent of the perforations; and indicating means responsive to motion of the feelers into the normal plane of the film.

4. In a device to inspect motion picture film of the type having a relatively wide picture track, a sprocket-receiving perforated track adjacent the picture track, and a continuous web outboard of the perforated track, the improvement comprising: a pair of film-receiving rollers adapted to straddle the film; means fixedly supporting one roller; a rockable arm retractably supporting the other roller in relation to said one roller to define a film-receiving nip; a third film-receiving roller adjacent to and parallel with the first two rollers; a pair of feelers adapted to ride on the perforated track and the continuous web, respectively, as the film travels over the third roller; a second rockable arm retractably supporting the feelers, the second arm having an extension adapted to engage and rock the first arm in the nip-opening direction when the second arm is rocked to feeler-retracting position.

5. In a device to inspect motion picture film, the improvement comprising; a pair of film-receiving rollers adapted to straddle the film and bear against substantially the entire width thereof, means retractably supporting one roller in relation to the other to define a film-receiving nip, electrical contact elements operable to establish a predetermined contact relationship in response to retractile movement of one roller in relation to the other due to the effective film thickness, and indicating means responsive to a succession of rapidly repeated operations of the contact elements.

6. In a device to inspect motion picture films, the improvement comprising; a pair of film-receiving rollers adapted to straddle the film and bear against substantially the entire width thereof, means retractably supporting one roller in relation to the other to define a film-receiving nip, electrical contact elements operable to establish a predetermined contact relationship in response to retractile movement of one roller in relation to the other due to the effective film thickness, a capacitor, means including a rectifier operable to charge the capacitor rapidly when said contact relationship is established, means independent of the rectifier establishing a relatively slow discharge circuit for the capacitor, and indicating means responsive to predetermined charge on the capacitor.

7. A device for detecting imperfections in a lengthy film having a sprocket track along one edge, the device comprising: a support member; a pair of spaced parallel guide rollers on the support member adapted to receive the film and support the same at a predetermined spacing from the support member; a detecting roller mounted on the support member to receive film travelling between the guide rollers, the detecting roller being adapted to ride under the main portion of the film but not the sprocket track; an arm rockably supported from the support member for rotation about an axis parallel to the axis of the detecting roller, the arm having a flexible feeler extending to position adjacent the detecting roller and adapted to ride on the sprocket track outboard that roller, the arm having a second feeler insulatingly supported in relation to the first feeler and extending to position adjacent the first feeler to be engaged thereby and establish electrical contact when the first feeler moves into the normal path of the sprocket track.

8. A detecting unit to detect imperfections in a film having a sprocket track along one edge, the unit comprising: a pair of rollers adapted to receive the film across the full width thereof; means supporting the rollers in parallel relation and urging the same together to define a film-receiving nip; means responsive to the relative positions of the rollers to indicate variations in effective film thickness; a film-receiving roller parallel to and spaced from the pair of rollers and adapted to receive and bear against the main portion of the film but not the sprocket track; an arm having a feeler adapted to bear against the sprocket track outboard the roller last mentioned; and means responsive to movement of the feeler into the normal path of the sprocket track to indicate imperfections therein.

9. A detecting unit to detect imperfections in a film having a sprocket track along one edge and a web outboard the sprocket track, the unit comprising: a pair of rollers adapted to receive the film across the full width thereof; means supporting the rollers in parallel relation and urging the same together to define a film-receiving nip; means responsive to the relative positions of the rollers to indicate variations in effective film thickness; a film-receiving roller parallel to and spaced from the pair of rollers and adapted to receive and bear against the major portion of the film but not the sprocket track or web; an arm having a pair of feelers adapted to bear against the sprocket track and the web outboard the roller last mentioned; and means responsive to movement of the feelers into the normal path of the sprocket track or the web respectively to indicate imperfections therein.

10. A detecting unit to detect imperfections in film of the type having a sprocket track along one edge and a web outboard the sprocket track, the unit comprising: a roller adapted to receive the film but not support the sprocket track or the web; a rigid rockable arm in juxtaposition with the roller; a pair of flexible fingers on the arm and positioned to bear resiliently on the sprocket track and the web respectively; and rigid contact fingers insulatingly carried by the arm and positioned to bear against the flexible fingers respectively when the flexible fingers are not supported by the film.

(References on following page)

References Cited in the file of this patent

UNITED STATES PATENTS

| | | |
|---|---|---|
| 1,480,845 | Vidaver | Jan. 15, 1924 |
| 2,076,471 | Loewer | Apr. 6, 1937 |
| 2,078,867 | O'Neill | Apr. 27, 1937 |
| 2,179,517 | Pelosi | Nov. 14, 1939 |
| 2,469,608 | Phillimore | May 10, 1949 |